United States Patent [19]

Smoot

[11] 4,042,816

[45] Aug. 16, 1977

[54] ILLUMINATED CURB FEELER

[76] Inventor: Joseph Smoot, 127 Alexander St., Dorchester, Mass. 02125

[21] Appl. No.: 654,412

[22] Filed: Feb. 2, 1976

[51] Int. Cl.² .............................................. B60Q 1/00
[52] U.S. Cl. ................................. 240/8.1 R; 240/8.2; 340/61
[58] Field of Search .................. 240/8.1 A, 8.1 R, 8.2, 240/8.22, 7.1 R; 340/87, 95, 61, 84, 89; 200/61.44

[56] References Cited

U.S. PATENT DOCUMENTS

| 2,050,981 | 8/1936 | Cohen | 240/8.1 A |
| 2,121,317 | 6/1938 | Cohen | 240/8.1 A |
| 2,224,032 | 12/1940 | Kline | 240/8.1 A |
| 2,753,439 | 7/1956 | Greenfield | 240/8.1 A |
| 3,369,116 | 2/1968 | Klingle | 240/8.1 A |
| 3,487,359 | 12/1969 | McClintock | 240/8.1 R |
| 3,578,964 | 5/1971 | Sherman | 240/8.1 A |

Primary Examiner—R. L. Moses
Attorney, Agent, or Firm—Wolf, Greenfield & Sacks

[57] ABSTRACT

A motor vehicle has four curb feelers each one attached adjacent a wheel of the vehicle and each one having a light bulb mounted at the outer end thereof. A conductor wire couples from the light bulb to a control circuit which in turn connects to the existing wiring in the car for operating the light bulb at two different illumination levels depending upon, for example, whether the turn signal has been used or the parking light has been lit. The bulb is protected by means of a surrounding metal coil and the assembly is encapsulated.

13 Claims, 4 Drawing Figures

ILLUMINATED CURB FEELER

BACKGROUND OF THE INVENTION

The present invention relates to a curb feeler that is used with a motor vehicle attached adjacent to the wheel of the vehicle and which has a bulb or the like at the free end thereof which may be illuminated conjointly with the illumination of one of the lights existing in the vehicle.

Accordingly, an object of the present invention is to provide a curb feeler wherein the light of the curb feeler operates in conjunction with the existing lighting system of the automobile. The lighted curb feeler may light in response to operation of the vehicle headlights, brake lights, turn signal lights, parking lights or emergency flashers. The illuminated curb feelers are particularly useful in the night time as, for example, they make the side of the vehicle more visible.

Another object of the present invention is to provide in essence an auxiliary lighting system for the vehicle which provides an added safety feature especially for pedestrians who would be apt to be attracted by the auxiliary lighting system.

A further object of the present invention is to provide an illuminated curb feeler that includes a special encapsulated bulb which reduces the likelihood of damaging the bulb should it touch a curb or other object.

Still another object of the present invention is to provide a control means or circuit coupling between the existing wiring of the vehicle and the bulb of the curb feeler for controlling illumination of the bulb at two different light levels depending upon which lighting device in the vehicle has been operated.

SUMMARY OF THE INVENTION

To accomplish the foregoing and other objects of this invention there is provided an illuminated curb feeler for use with a motor vehicle. Typically, four of these curb feelers are used adjacent each wheel of the vehicle. Actually, the curb feelers may also be used with motorcylces or even with a conventional bicycle. The curb feelers comprises an elongated member which may be in the form of a coil that is flexible, and means at one end of the elongated member for supporting the member from the vehicle extending outwardly from the vehicle. When the curb feeler is used with a motor vehicle the supporting means may be bracket fastened to the bumper or fender to mount the elongated member adjacent to the wheel of the vehicle. The curb feeler also comprises a socket, means for securing the socket to the other end of the member, and a lighting assembly received by the socket and including a bulb and means encapsulating the bulb to protect the bulb.

In the disclosed embodiment a conductor wire couples from the lighting assembly to an internal location in the vehicle and connects to a circuit means which includes two separate ciruit paths for causing illumination of the bulb at two different light levels. One of the paths may connect to the turn signal conductor and the other path may connect to the parking light conductor. Thus, when the rear parking light or tail light is turned on the bulb is illuminated at a low light level and if a turn signal is used the bulb is illuminated at a second higher light level. In one of the most simple forms of the invention the conductor wire from the bulb of the curb feeler may connect directly to an existing wire such as the wire coupling to the turn signal lamp.

Some of the advantages of the illuminated curb feeler are that the vehicle is more visible at night from the side, the tires, fenders, bumpers and hub caps are protected when parking, the proper parking distance from the curb is obtained, the visibility of the car is enhanced when the warning flashers are activated and the turn signals and brake light signals are more visible especially if the vehicle is pulling a trailer which may block the existing rear lights of the vehicle.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
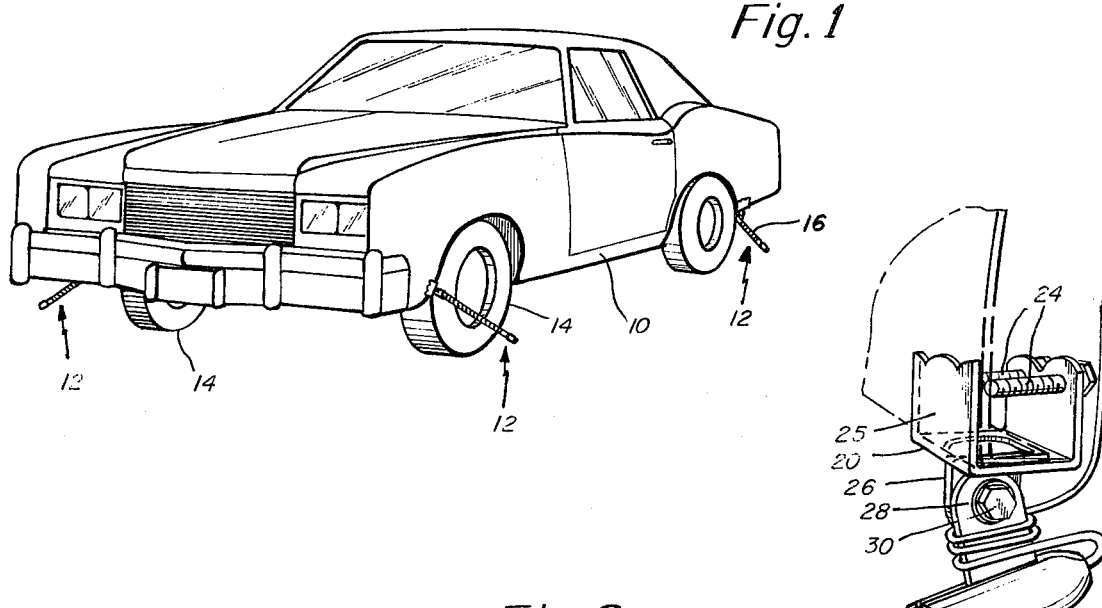
FIG. 1 shows the curb feelers of this invention attached to a motor vehicle.
Figure 2:
FIG. 2 is a perspective view of one of the curb feelers shown in more detail attached to a part of the vehicle.

FIG. 1 shows a motor vehicle 10 having the illuminated curb feelers 12 of the present invention secured adjacent the wheels 14 of the vehicle. FIG. 2 shows one of the illuminated curb feelers 12 in more detail. This feeler comprises an elongated coil 16 supported at one end in a bullet-shaped member 18, a bracket 20 for attaching the feeler to the motor vehicle, and a lighting assembly 22 attached to the other end of the coil 16. The bracket 20 is U-shaped and has a pair of threaded screws or bolts 24 extending through one leg of the bracket toward another leg of the bracket. The portion of the car to which the feeler is to be attached is inserted between the end of each of the screws 24 and the other leg 25. The bracket 20 couples to the member 18 by means of an adjusting arrangement including a flange 26 attached to the bracket 20 and a second flange 28 fixedly attached to the member 18. A screw 30 ties flanges 26 and 28 together but may be loosened to permit relative rotation between these flanges and thus permit a tilting of the curb feeler to a desired angle such as is shown in FIG. 1.

Figure 3:
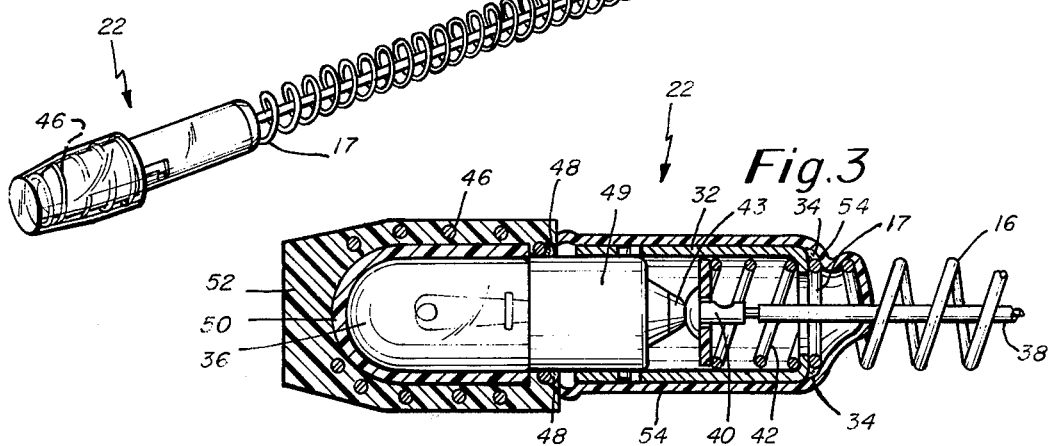
FIG. 3 is a cross sectional view taken along line 3—3 of FIG. 2 showing the lighting assembly in more detail.

Referring now to FIGS. 2 and 3, the metal coil 16 may be force fitted into the member 18 or secured thereto in another suitable manner. The other end 17 of the coil 16 is shown in FIG. 3 as attaching to the socket 32 of the lighting assembly by means of a solder joint 34. The socket 32 is thus electrically connected to the coil 16 which in turn couples by way of the member 18 and the bracket 20 to the car frame for providing an electrical ground path. The socket 32 receives a conventional single filament incandescent bulb 36. The bulb is locked into the socket in a conventional manner by means of nipples on the bulb that fit within slots in the socket.

A conductor wire 38 couples through the coil 16 and is preferably wound about three times about the flange 28 as shown in FIG. 2. This prevents a pulling action on the conductor wire 38 at the end where it connects to the socket 32. The conductor wire couples to a plunger 40 which is biased to the left as viewed in FIG. 3 by means of a spring 42. When the bulb is in place this causes intimate contact between the end of the plunger 40 and a center terminal 40 of the bulb 36.

In order to protect the bulb and also to reduce the likelihood of water damaging the assembly there are some additional components added to the total lighting assembly. An additional coil 46 is connected to the bulb 36 by a solder joint 48 which attaches the coil to the metallic base 49 of the bulb 36. However, prior to attaching the coil 46 a rubber boot 50 is slid over the glass portion of the bulb 36 to provide cushion for the bulb. The coil 46 is then attached to the bulb. Thereafter, an encapsulant 52 disposed over the entire bulb structure to provide a unitary bulb structure. This encapsulant may be an epoxy substance. If a bulb does become damaged and is not operable the entire bulb assembly can be removed and a new one inserted in its place. In order to protect the socket 32 there is provided a rubber sleeve 54 which extends along the entire distance of the socket and over a portion of the end 17 of the coil 16. Heat may be applied in the area that the sleeve extends over the coil so that the plastic melts and provides a bond over the coil and the solder joint 34. In this way water leakage into the socket is prevented. Because of the heat that may be applied for example to the socket it may be preferred to use a teflon coated wire 38.

Figure 4:
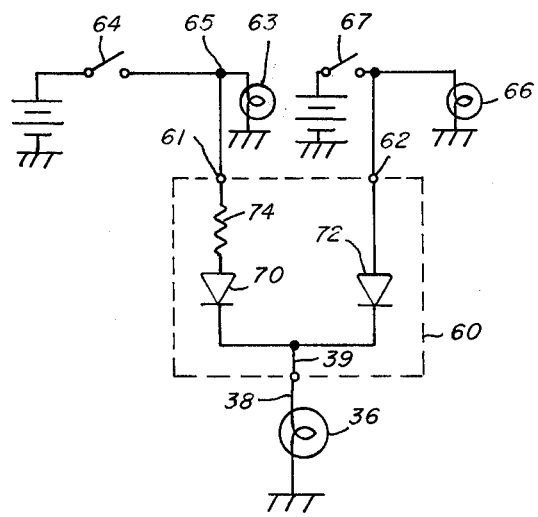
FIG. 4 is a circuit diagram associated with the present invention.

FIG. 4 shows the bulb 36 in a schematic fashion and also shows one side of a bulb connecting to a ground which is accomplished by way of the supporting coil 16 and the other side connecting by way of conductor 38 to a box 60 which may be suitably supported inside of the vehicle in an appropriate location. The lead 39 from the box 60 couples to the conductor wire 38. The other two leads 61 and 62 from the box 60 couple to the existing wiring. In the example given the wire 61 couples to a parking light 63 which is normally operated from the parking light switch 64. A suitable connector can be provided to tie the wires at point 65. Similarly, the output line 62 couples to a turn signal lamp 66 which is normally operated from a turn signal switch 67. The lamp 66 also functions as a brake lamp. FIG. 4 shows the lamps 63 and 66 as being separate. It is possible that they could also be contained within one lamp housing as separate filaments.

The box 60 contains a circuit including diodes 70 and 72 and limiting resistor 74. In the example that is given if the operator of the vehicle turns on the park lights or tail lights, the vehicle parking light 63 is illuminated but also a current flows by way of resistor 74 and diode 70 to the curb feeler lamp 36 causing this to be illuminated at a low light level because of the limiting current provided by resistor 74. If the operator of the vehicle uses a turn signal either with or without the lamp 63 being illuminated, the lamp 66 is illuminated and a current also flows by way of diode 72 to the curb feeler lamp 36 causing this to be illuminated at a higher light level. Similarly, if the brakes of the vehicle are applied a current also flows by way of the diode 72 to cause a fuller illumination of the lamp 36.

A box 60 is associated with each curb feeler and thus in a normal vehicle there are four boxes 60, one probably associated or located near each wheel of the vehicle. The front curb feelers may be operated in a similar manner to that shown in FIG. 4. For example, the wire 62 may couple to the park lights which are also used as emergency flashers and the wire 61 may connect to the existing wiring connecting to the headlights.

It is usually preferred to use four curb feelers, in which case the boat 50 which is a color filter, may be "red" for the two rear feelers and "amber" for the two front feelers, thus corresponding to the conventional lighting arrangement used on the vehicle itself.

FIG. 4 shows a single filament bulb 36. In accordance with another arrangement of this invention a double filament bulb could be used. However, it has been found that it is more desirable to use the smaller single filament bulb as it is not desirable to provide too large a lighting assembly. This would become too cumbersome and too heavy for the end of the coil 16 to support.

Having described a limited number of embodiments of this invention it should now become apparent to those skilled in the art that numerous modifications can be made herein all of which are contemplated as falling within the scope of this invention.

What is claimed is:

1. An illuminated curb feeler for use with a motor vehicle comprising;
an elongated member,
means at one end of the member for supporting the member from the vehicle extending outwardly from the vehicle to position said curb feeler to contact a curb,
a lamp socket,
means for securing the socket to the other end of the member,
a lighting assembly received by the socket and including a bulb when said assembly contacts a curb and means encapsulating the bulb to protect the bulb,
and means for coupling power to the socket to illuminate the bulb.

2. An illuminated curb feeler as set forth in claim 1 wherein said elongated member includes a coil means.

3. An illuminated curb feeler as set forth in claim 2 wherein said means for supporting the coil means includes a bracket for attaching the coil means to the vehicle body.

4. An illuminated curb feeler as set forth in claim 3 including means for adjusting the position of the coil means relative to the bracket.

5. An illuminated curb feeler as set forth in claim 4 wherein said socket is secured to the other end of the coil means by a solder joint.

6. An illuminated curb feeler as set forth in claim 5 including a second coil means surrounding the bulb.

7. An illuminated curb feeler as set forth in claim 1 wherein said means encapsulating the bulb comprises a boot over the bulb, a coil means disposed over the bulb and boot, and a hard filler material surrounding the coil means and boot.

8. An illuminated curb feeler as set forth in claim 1 including means for pivotally adjusting the position of the elongated member relative to the supporting means for the elongated member, and said elongated member being flexible.

9. An illuminated curb feeler as set forth in claim 1 including control means coupled between the power coupling means and the existing vehicle wiring.

10. An illuminated curb feeler as set forth in claim 9 wherein said control means connects to two different wires associated with different lights of the vehicle.

11. An illuminated curb feeler as set forth in claim 10 wherein said control means includes two path defining means, one responsive to operation of a first light of the vehicle for illuminating the bulb at a first light level and another responsive to operation of a second light of the vehicle for illuminating the bulb at a second light level different from the first light level.

12. An illuminated curb feeler as set forth in claim 11 wherein one of said path defining means includes a current limiting means.

13. An illuminated curb feeler as set forth in claim 12 wherein both path defining means includes a unilaterally conducting device.

* * * * *